United States Patent [19] | [11] 3,909,641
Ohshima et al. | [45] Sept. 30, 1975

[54] HOLDER DEVICE FOR A VIBRATOR

[75] Inventors: Yoshimune Ohshima; Junichi Ishiwata, both of Tokyo, Japan

[73] Assignee: Kabushiki Kaisha Meidensha, Tokyo, Japan

[22] Filed: Sept. 4, 1973

[21] Appl. No.: 394,521

Related U.S. Application Data

[63] Continuation of Ser. No. 230,920, March 1, 1972, abandoned.

[52] U.S. Cl. .................. 310/9.7; 310/9.5; 310/9.6; 310/9.8; 310/9.4

[51] Int. Cl.$^2$ ........................................ H01L 41/04

[58] Field of Search .............. 310/8.2, 8.5, 8.6, 9.1, 310/9.4, 9.7, 9.8

[56] References Cited

UNITED STATES PATENTS

| | | | |
|---|---|---|---|
| 2,472,179 | 6/1949 | Tibbetts | 310/9.8 X |
| 3,221,189 | 11/1965 | Brandt et al. | 310/9.1 |

FOREIGN PATENTS OR APPLICATIONS

| | | | |
|---|---|---|---|
| 266,966 | 12/1970 | U.S.S.R. | 310/9.7 |
| 1,113,477 | 9/1961 | Germany | 310/9.6 |

OTHER PUBLICATIONS

Flexure Mode Piezoelectric Crystals, "The Marconi Review," Vol. XVI, No. III, Oct. 15, 1953, pp. 150–167.

*Primary Examiner*—Mark O. Budd
*Attorney, Agent, or Firm*—Hans Berman

[57] ABSTRACT

In a piezoelectric vibrator wherein a plurality of split electrodes having recesses and projections are mounted on major surfaces of a plate shape vibrator element and leads pieces of conductive holder pieces are attached to respective split electrodes or inserted into perforations provided at respective split electrodes through the vibrator element, characterized device characterized fact that the projections and recesses of the electrodes are disposed in such a manner that said holder holder pieces of said holder leads attached to opposite electrodes are of the same electrical solarity.

3 Claims, 10 Drawing Figures

HOLDER DEVICE FOR A VIBRATOR

This is a continuation of application Ser. No. 230,920, filed Mar. 1, 1972, now abandoned.

This invention relates to a piezoelectric vibrator, more particularly it relates to an improved lead arrangement for a vibrator.

Generally, there are two kinds of vibrators having a length-width flexural vibration mode and a X-Y flexural vibration mode in the composite vibrator. The vibrator having the length-width flexural vibration mode comprises a plurality of split electrodes mounted on the upper and lower major surfaces of the vibrator made of a quartz plate or ceramic dielectric plate, and holder pieces or leads attached to points of the respective split electrodes aligned with each other in the direction of nodal axes perpendicular to the major faces of the vibrator element. In this case, when a voltage is applied to said split electrodes through the holder pieces, the vibrator element contracts at one side and extends at the other side resulting in distortion of the vibrator element into a fan. Therefore, when alternating voltage is applied to the split electrodes at a basic frequency of the vibrator element, continuous flexural vibration occurs in the vibrator.

Further, the vibrator having the X-Y flexural vibration mode comprises a plurality of split electrodes mounted on the upper and lower surfaces as well as both sides of the vibrator element made of a quartz plate or ceramic plate and holder pieces attached to vibration nodal points of the vibrator element through the split electrodes. In this case, the split electrodes provided at both sides of the vibrator element have projections intersected by the nodal axes for the electrical conduction purpose, and the holder pieces or leads are disposed in the opposed relation to each other through the projections. In this type of the composite vibrator, electrodes must be attached to the vibrator element in the vertical direction. Therefore, the attachment of the electrodes are very difficult. Moreover, it is preferable that the holder pieces or leads are fixed at the points of both ends of the vibrator element (where, $l$ = the total length of the vibrator). However adjustment of the attachment points is also very difficult. Further, the holder pieces must be respectively insulated so that the vibrator may be surely excited.

It is, therefore, a general object of this invention to provide an improved lead arrangement for the vibrator which eliminates the above-described disadvantages.

Figure 1A:
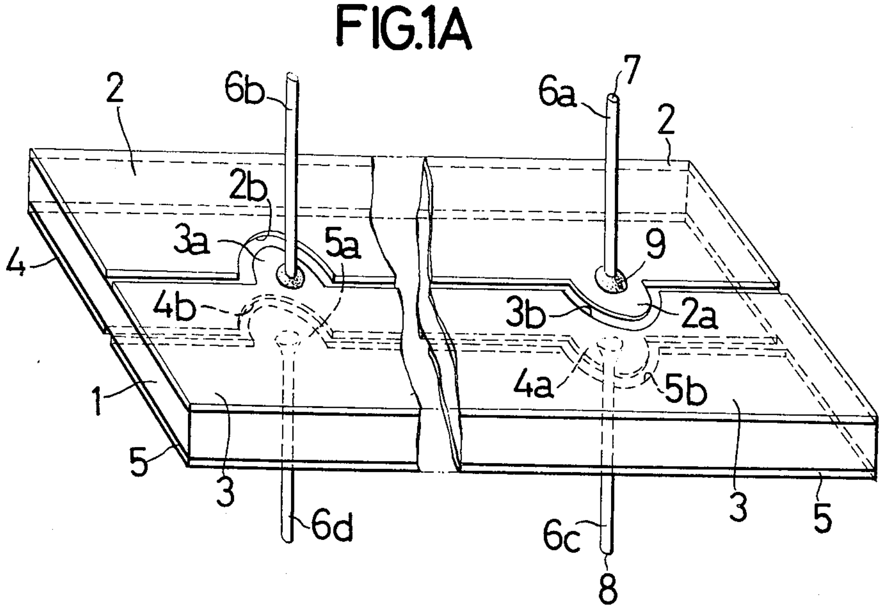
Figure 1B:
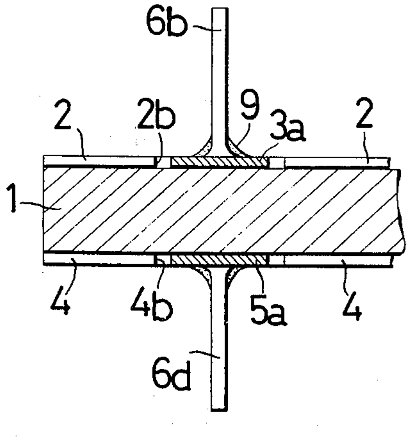
Figure 1C:
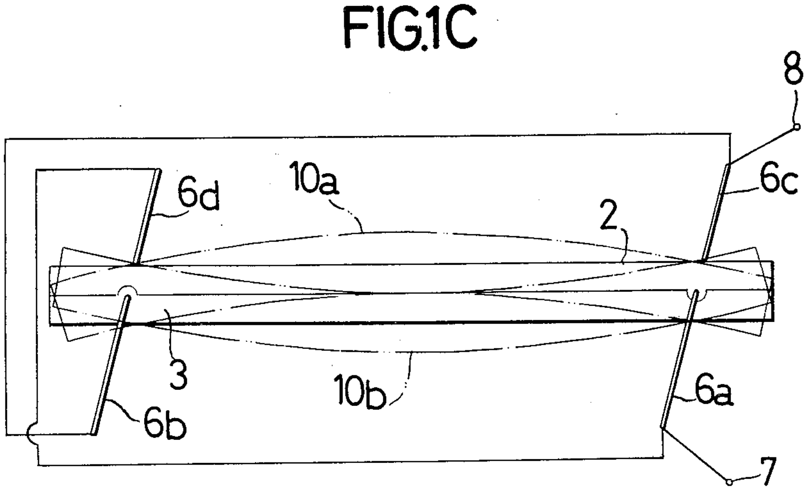
Figure 2A:
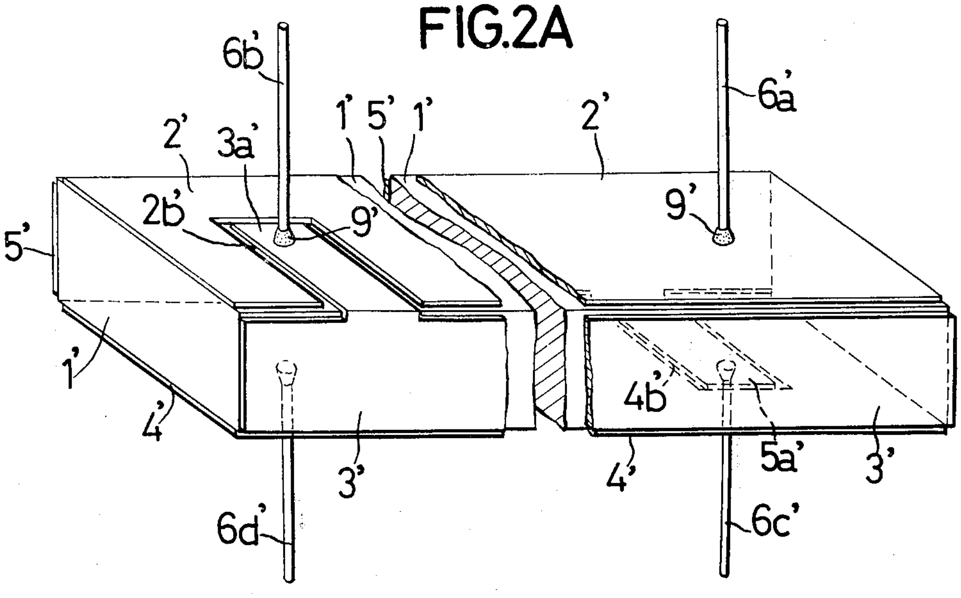
Figure 2B:
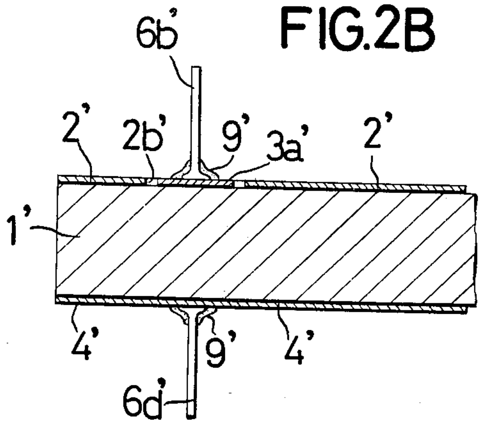
Figure 2C:
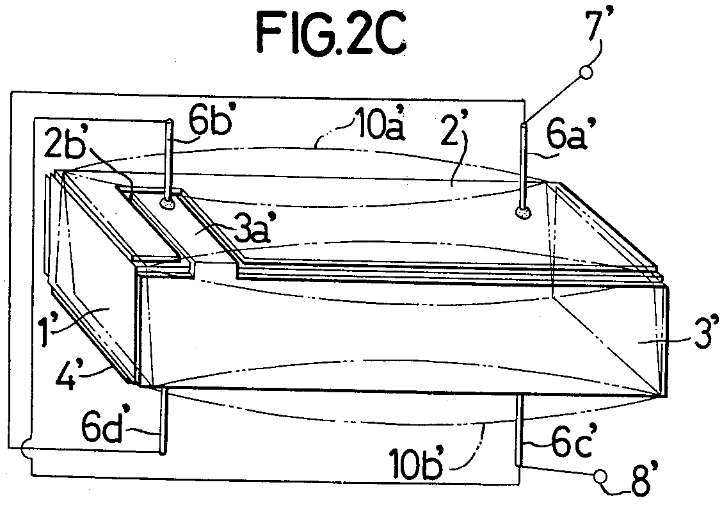
Figure 3:
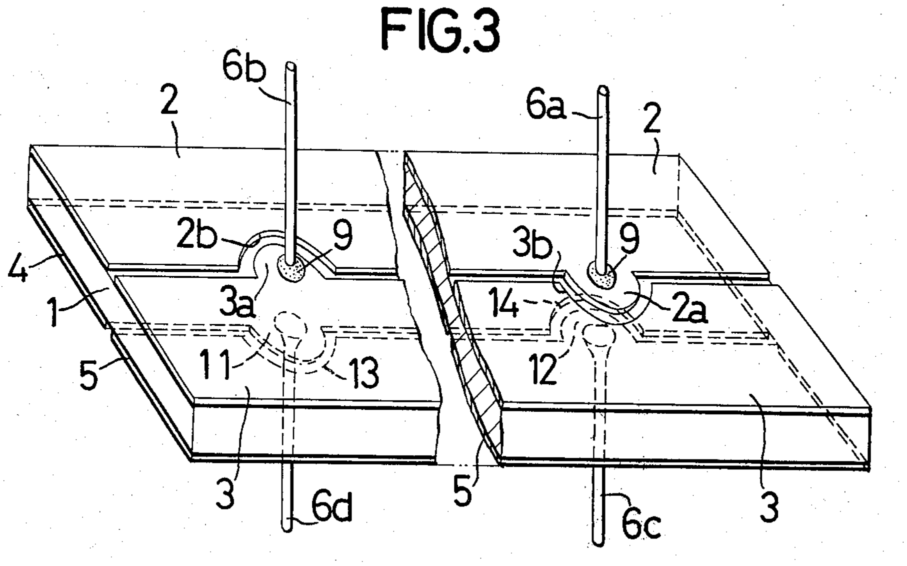
Figure 4:
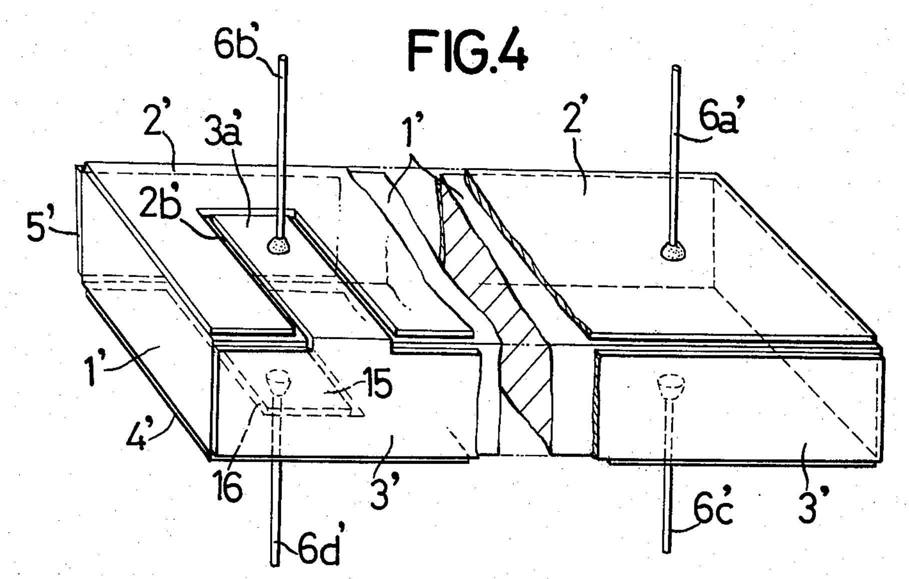
Figure 5:
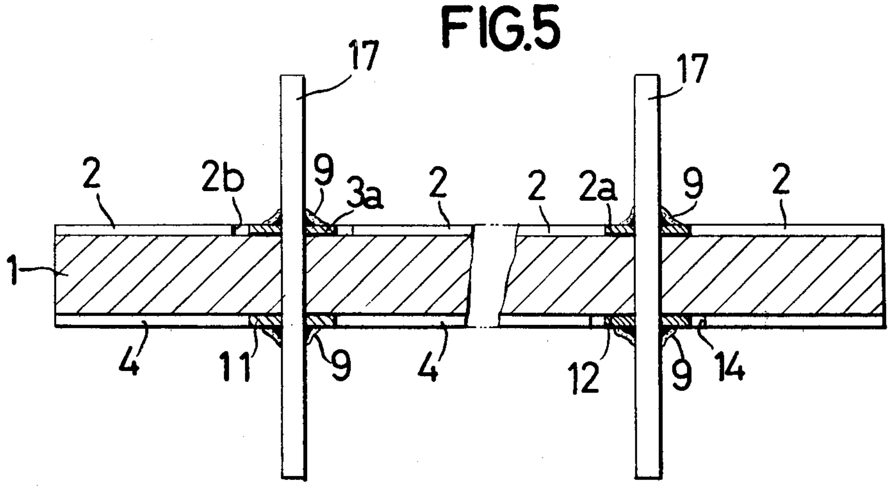
Figure 6:
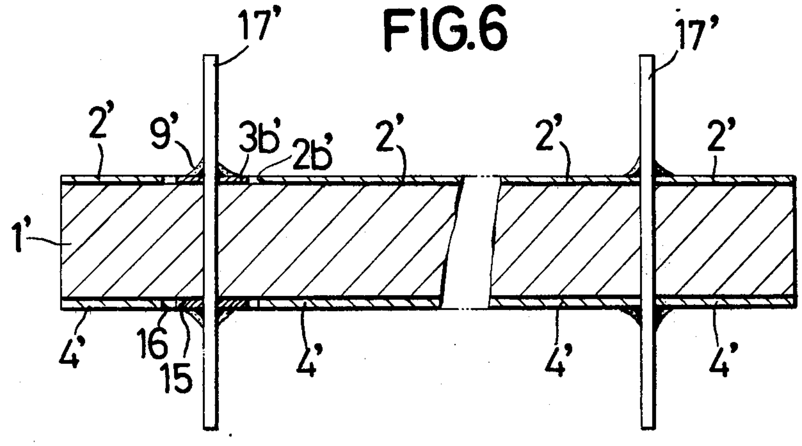

The above and other objects and advantages of this invention will be apparent from the following description in connection with the attached drawings in which;

FIGS. 1A - C show a prior art vibrator having a length-width flexural vibration mode;

FIGS. 2A - C show a prior art vibrator having an X-Y flexural vibration mode;

FIG. 3 embodiment of a showing a first embodiment of a shows a vibrator having a length-width flexural vibration mode according to this invention;

FIG. 4 embodiment of a showing a first embodiment of a shows for a vibrabor having an X-Y flexural vibration mode according to this invention;

FIG. 5 shows another of vibrator having a length-width flexural vibration mode according to this invention; and FIG. 6 of shows another vibrator having an X-Y flexural vibration mode according to this invention.

FIGS. 1A and 1B show a prior art vibrator having a length-width flexural vibration mode. A reference number 1 denotes a vibrator element made of a quartz plate or ceramic plate. As shown in FIG. 1A, a split electrode 2 having a recess **2*b* and a projection 2*a* is mounted on one major surface of the vibrator element 1. A split electrode 3 having a projection 3*a* and a recess 3*b* is mounted on the same surface of the vibrator element 1. In this case, the projection 2*a* and the recess 2*b* of the electrode 2 are associated with the recess 3*b* and the projection of the electrode 3 respectively. Further, a split electrode 4 having a projection 4*a* and a recess 4b is mounted on the major surface of the vibrator element 1, and a split electrode 5 having a projection 5*a* and a recess 5*b* is mounted on the other surface of the vibrator element 1. In this case, the projection 4a and the recess 4b of the split electrode 4 are associated with the recess 5*b* and the projection 5*a* of the split electrode 5, respectively. The recess 2 *b* and the projection 3*a* are respectively aligned in the direction of plate thickness with the recess; 4b and the projection 5*a*. The projection 2*a* and the recess 3*b* are similarly aligned with the projection 4a and the recess 5*b* respectively. As is also evident from FIG. 1B, a lead 6*a* is secured to the projection 2*a* of the first electrode 2 by an adhesive 9 in the neighbourhood of a nodal axis of the vibrator element. Similarly, conductive leads 6*b*, 6*c* and 6*d* are adhered to the projections 3*a*, 4*a* and 5*a* of the electrodes 3, 4 and 5** respectively in the neighbourhood of the vibration nodes.

FIGS. 2A and 2B show a prior art vibrator having an X-Y flexural vibration mode. First and third electrodes 2' and 4' are mounted on the upper and lower surfaces of a vibrator element 1' made of a quartz plate or ceramic plate respectively, and second and fourth electrodes 3' and 5' are mounted on both sides of the vibrator element 1' respectively. Recesses **2*b*' and 4*b*' are provided in the first and third electrodes 2' and 4' respectively and projection 3*a*' and 5*a*' are formed on the second and fourth electrodes 3' and 5'. The projections 3*a*' and 5*a*' are received in the recesses 2*b*' and 4*b*' respectively. The lead 6*a*' is attached to the first electrode 2'. The lead 6*b*' is attached to the second electrode 3' at the projection 3*a*'. The holder piece 6*c*' is attached to the fourth electrode 5' at the projection 5*a*'. The lead 6*d*' is attached to the third electrode 4'. Moreover, the lead 6*a*' is opposite the lead 6*c*', and the lead 6*b*' is opposite the lead 6*d*'**.

As is shown in FIGS. 1C and 2C the leads **6*a*, 6*a*' and 6*c*, 6*c*' are electrically connected to the leads 6*d*, 6*d*' and 6*b*, 6*b*' respectively. Therefore, when electrical power is supplied to terminals 7, 7' and 8, 8' such that a positive potential is applied to the first and fourth electrodes 2, 2' and 5, 5' and a negative potential is applied to the second and third electrodes 3, 3' and 4, 4', the vibrator elements 1, 1' expand at the upper surface and contract at the lower surface, whereby the vibrator elements 1, 1' are distorted as shown at 10*a* and 10*a*' in FIGS. 1C and 2C. When the electrical power supplied to the terminals 7, 7' and 8, 8' is reversed in polarity, the vibrator elements 1, 1' are distorted into a fan shape as shown at 10*b* and 10*b*' in FIGS. 1C and 2C. When alternating electrical potential is applied to the terminals 7 and 8 at the basic frequency of the vibrator elements 1, 1', flexural vibration occurs in the vibrator elements 1, 1'**.

Such prior art devices have following disadvantages;

A. Since the leads are attached to respective electrodes at right angles to the major faces to the vibrator element, a. Attachment of the leads is very diffcult.

b. Adjustment of the attachment position is very difficult.

c. Contact between an electrode plate and a lead extends over a comparatively large area, not a point.

B. While the vibrator element is being excited, d. It is necessary to electrically insulate leads from each other.

e. Electrical connection between respective electrodes is made diagonally relative to the element.

FIG. 3 shows a vibrator having the width-length flexural vibration mode to which this invention is applied. In FIG. 3, the first split electrode 2 having the projection 2*a* and the recess 2*b* is mounted on one major surface of the vibrator element 1. The second split electrode 3 having the projection 3*a* and the recess 3*b* is mounted on the same surface of the vibrator element 1. The projection 2*a* is received in the recess 3*b* and the projection 3*a* in the recess 2*b*. The third split electrode 4 having the projection 11 and the recess 14 is mounted on the other surface of the vibrator element 1, and the fourth electrode 5 having the projection 12 and the recess 13 is also mounted on the other surface of the vibrator element 1. The recess 2*b* and the projection 3*a* are aligned with the projection 11 and the recess 13 and the projection 2*a* and the recess 3*b* are aligned with the recess 14 and the projection 12. Leads 6*a*, 6*b*, 6*c* and 6*d* are attached to projections 2*a*, 3*a*, 11 and 12 by an adhesive 9 respectively. Therefore, the leads 6*a* and 6*b* are oppositely aligned with the leads 6*c* and 6*d*.

When electrical power is applied to the vibrator, the leads 6*a* and 6*c* have the same polarity and the leads 6*b* and 6*d* have the same polarity, and the leads 6*a* and 6*c* have the same opposite polarity. Thus, for example when a positive potential is applied to the first electrode 2, a negative potential is applied to the second electrode 3. Further, when a positive potential is applied to the fourth electrode 5, a negative potential is applied to the third electrode 4. Thus, flexural vibration occurs as in the case of the prior art vibrator shown in FIGS. 1A through 1C.

FIG. 4 shows a vibrator operating in the X-Y flexural vibration mode to which this invention is applied.

The projection 3*a*′ of the second electrode 3′ mounted on narrow, longitudinal side of the vibrator element 1 is attached to the upper major surface of a vibrator element 1. The projection 15 is provided on the fourth electrode 5′ mounted on the narrow, longitudinal side of the vibrator element 1. A recess 16 is formed in the third electrode 4′ opposite the recess 2*b*′ of the first electrode 2′ which receives the projection 3*a*′. The projection 15 is aligned with the projection 3*a*′ of the second electrode 3′. The opposite leads 6*b*′ and 6*d*′ are attached to the projections 3*a*′ and 15, while the leads 6*a*′ and 6*c*′ opposed are opposed oppositely aligned and attached to the first and third electrodes 2′ and 4′.

During the operation of the vibrator shown in FIG. 4, the leads 6*b*′ and 6*d*′ have the same polarity, and the leads 6*a*′ 6*c*′ have the same opposite polarity. Therefore, when a positive potential is applied to the first electrode 2′, a negative potential is applied to the second electrode 3, and when a positive potential is applied to the fourth electrode 5′, a negative potential is applied to the third electrode 4′. Therefore, continuous flexural vibration occurs as in the case of the vibrator shown in FIGS.

The vibrators shown in FIGS. 3 and 4 have the following advantages;

a. When the vibrators are excited in the flexural vibrator mode, the vibration will be effected by a simple electrical connection.

b. Since insulation between respective leads can be easily accomplished, manufacturing is simplified.

c. Since a cross connection is not needed when exciting, security in electricity is improved.

FIG. 5 shows a vibrator operating in the width-length flexural vibration mode which is identical with the embodiment of FIG. 3 except as specifically shown. Vertical holes are provided at projections 2*a*, 12 and 3*a*, 11 through the vibrator element 1. The holes are substantially uniform in diameter through the thickness of the vibrator element 1 or they may be tapered at an angle of 10° or less. The surfaces may be etched and then conductive rods 17 inserted into the holes and fixed by adhesive 9 to serve as common leads for the connected electrodes;

FIG. 6 shows the vibrator of FIG. 4 modified in a manner analogous to FIG. 5.

Vertical holes are formed from the first electrode 2′ to the third electrode 4′ through the vibrator element 1′, and similarly between the projections 3*a* and 15, Leads 17′ are inserted into the vertical holes and fixed by adhesive 9′.

The lead arrangement according to FIGS. 5 and 6 has the following advantages in addition to the above-described advantages (a) – (c).

e. Since the lead rods are inserted into holes provided at the contact area, an electrical connection between opposite leads is not needed.

f. Since the location of the supporting points of the vibrator is determined by a perforation machine, the possibility of lead misalignment is practically eliminated, nodal points of the vibrator are surely held and thus manufacture is easy.

g. The mechanical strength of the lead arrangements improved since perforations are formed and lead rods are inserted into the perforations and fixed therein.

This invention is not limited to the above described embodiments but various variation and modifications may be made without departing from the scope and spirit of this invention.

What is claimed is:

1. A piezo-electric vibrator operating in an X-Y flexural vibration mode, said vibrator comprising:

a. a piezo-electric crystal plate having two opposite major surfaces, and edges connecting said surfaces, two of said edges constituting opposite front and rear surfaces;

b. two first electrodes respectively superposed on said major surfaces, 1. each first electrode having a recess intersected by a first nodal axis of vibration of said crystal plate, 2. said axis being perpendicular to said major surfaces and spaced from the edges of said crystal plate;

c. two second electrodes respectively superimposed on said front and rear surfaces, 1. each second electrode having a projection perpendicular to the associated front or rear surface and extending along a respective one of said major surfaces, 2. said projections being received in said recesses respectively, 3. said projections projecting from the associated second electrodes in opposite directions and being intersected by said nodal axis, 4. said crystal plate and said projections being formed with respective passageways aligned along said nodal axis, 5. said crystal plate having a second nodal axis perpendicular to said major surfaces and spaced from said edges and from said first axis, said second axis intersecting said first electrodes, the first electrodes and said crystal plate being formed with respective passageways aligned along said second axis;

d. a first lead passing through the passageways of said crystal plate and of said projections aligned along said first nodal axis and being electrically connected to said intersected projections; and e. a second lead passing through the passageways of said crystal plate and of said first electrodes aligned along said second axis, 1. each of said leads being mechanically fastened to said crystal plate in a passageway of the crystal plate and extending outwardly away from said major surfaces.

2. A vibrator as set forth in claim 1, wherein respective surfaces of said crystal plate in said passageways are etched.

3. A vibrator as set forth in claim 1, wherein said leads are tapered in the direction of the associated axis.

* * * * *

UNITED STATES PATENT AND TRADEMARK OFFICE

CERTIFICATE OF CORRECTION

PATENT NO. : 3,909,641

DATED : September 30, 1975

INVENTOR(S) : YOSHIMUNE OHSHIMA ET AL

It is certified that error appears in the above-identified patent and that said Letters Patent are hereby corrected as shown below:

In the heading, after line [63], insert --

[30] Foreign Application Priority Data

March 13, 1971 Japan ................ 13852/71

Signed and Sealed this

*ninth* Day of *December 1975*

[SEAL]

*Attest:*

RUTH C. MASON
*Attesting Officer*

C. MARSHALL DANN
*Commissioner of Patents and Trademarks*